United States Patent
Vialard et al.

(10) Patent No.: US 12,280,574 B2
(45) Date of Patent: Apr. 22, 2025

(54) FOIL CARD MADE FROM RECYCLED RAW MATERIALS

(71) Applicant: THALES DIS FRANCE SAS, Meudon (FR)

(72) Inventors: Camille Vialard, Roquevaire (FR); Laurence Ansaldi, Aubagne (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/555,542

(22) PCT Filed: Apr. 15, 2022

(86) PCT No.: PCT/EP2022/060193
§ 371 (c)(1),
(2) Date: Oct. 16, 2023

(87) PCT Pub. No.: WO2022/219193
PCT Pub. Date: Oct. 20, 2022

(65) Prior Publication Data
US 2024/0198647 A1   Jun. 20, 2024

(30) Foreign Application Priority Data
Apr. 16, 2021   (EP) ..................... 21305502

(51) Int. Cl.
*B32B 27/30* (2006.01)
*B32B 15/20* (2006.01)
*G06K 19/077* (2006.01)

(52) U.S. Cl.
CPC ............ *B32B 27/304* (2013.01); *B32B 15/20* (2013.01); *G06K 19/07722* (2013.01); *G06K 19/07775* (2013.01); *B32B 2250/05* (2013.01); *B32B 2272/00* (2013.01); *B32B 2307/412* (2013.01); *B32B 2425/00* (2013.01)

(58) Field of Classification Search
None
See application file for complete search history.

(56) References Cited

U.S. PATENT DOCUMENTS 10,414,193 B2 * 9/2019 Riedl ..................... B32B 27/40
2007/0244709 A1   10/2007 Gilbert

FOREIGN PATENT DOCUMENTS

WO   2020160239 A1   8/2020

OTHER PUBLICATIONS

International Search Report (PCT/ISA/210) and Written Opinion (PCT/ISA/237) mailed on Aug. 11, 2022, by the European Patent Office as the International Searching Authority for current International Application No. PCT/EP2022/060193—[12 pages].

* cited by examiner

*Primary Examiner* — Kristy A Haupt

(57) ABSTRACT

Provided is a card comprising an antenna connected to a chip, the card comprising: A central PVC core made of recycled PVC supporting the antenna; Two recycled PVC layers, a front side PVC layer and a back side PVC layer, each PVC layer being laminated on a side of the central PVC core, the front side PVC layer being laminated on the side of the PVC core supporting the antenna; Two transparent PET layers, a front side PET layer and a back side PET layer, the PET layers being glued on each of the recycled PVC layers, the front side PET layer being metalized by an aluminum foil; and Two PVC transparent overlays glued on each external face of the card.

12 Claims, 1 Drawing Sheet

FOIL CARD MADE FROM RECYCLED RAW MATERIALS

FIELD

The invention concerns foil cards and more precisely cards with.

BACKGROUND

A foil card is a card of for example the format ID-1 as defined by ISO/CEI 7810. Such a card is a standard banking card for example, comprising an embedded antenna for contactless transactions and metal contacts on the front of the card for communicating with ATMs (Automatic Teller Machines) for example or retailers POS (Point Of Sales). The antenna and the contacts are connected to a chip comprising a banking application.

The main components of a banking card are usually made of plastic.

The particularity of a foil card is that it comprises an aluminum foil glued or pressed on a PET sheet. This permits to give a metalized aspect to the card (on the side of the contacts) and to print on it by offset a colored ink, on the entire face of the foil or on only a part of it, with different colors. This permits to personalize the card, by printing an image, colored artwork, organization logo, . . . on the front of the card. The said printed PET with aluminum foil is covered by a transparent overlay in PVC in order to protect the printing.

In the current context of ecological crisis linked to plastic pollution, the invention proposes to reduce as much as possible the inputs of new (virgin) plastic on the planet, and try to reuse material which are already produced and available. In the banking card business, many customers are sensitive to this approach but are not willing to change their card design. Banking cards (colored, transparent or foil) today are made only with virgin raw materials (PVC, PET, metal).

It is also known that in a dual interface card (contact+ wireless) or in a wireless card in general, where the antenna embedded on a PVC layer is laminated in between two plastic layers, the PVC and most of all metalized PET layers (in the case of a foil card where the PET is glued with the aluminum foil) which composed those two plastic layers, are creating barriers for the signal of the antenna, reducing its RF performances. There is here a problem of RF communication between the card and a card reader (typically in a shop where contactless readers connected to bank servers are provided).

SUMMARY

The invention proposes a solution to these problems.

More precisely, the invention proposes a card comprising an antenna connected to a chip, the card comprising:
A central PVC core made of recycled PVC supporting the antenna;
Two recycled PVC layers, a front side PVC layer and a back side PVC layer, each PVC layer being laminated on a side of the central PVC core, the front side PVC layer being laminated on the side of the PVC core supporting the antenna;
Two transparent PET layers, a front side PET layer and a back side PET layer, the PET layers being glued on each of the recycled PVC layers, the front side PET layer being metalized by an aluminum foil;
Two PVC transparent overlays glued on each external face of the card.

The antenna is preferably made of recycled cupper.

Advantageously, the antenna is engraved on the PVC core.

Preferably, the PET layers are made of recycled PET.

Also preferably, the transparent PVC overlays are made of recycled PVC.

The invention also concerns a card wherein the aluminum foil is preferably constituted of recycled aluminum.

The card has preferably also external contacts connected to the chip.

This card can be for example:
a banking card, or
a loyalty card.

Advantageously, the card according to the invention is only composed of recycled material.

Preferably, recycled PVC layers are made of 99% or less of recycled PVC.

Preferably, the recycled PVC layers are made of at least 25% of recycled PVC.

Finally, the recycled PVC layers are preferably white, colored or transparent.

BRIEF DESCRIPTION OF THE DRAWINGS

Other features of the present invention will be described in regard of the following description of the figures that represent.

DETAILED DESCRIPTION

Figure 1:
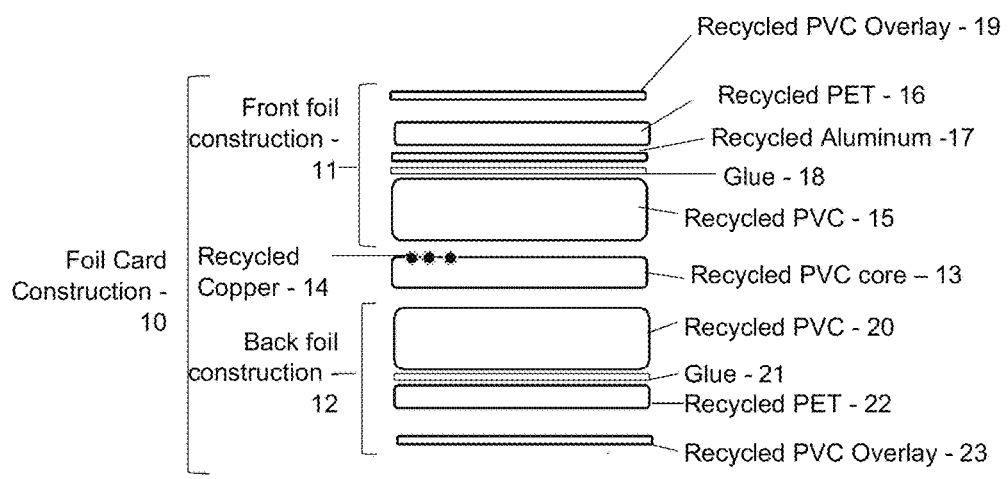
FIG. 1 an example of the structure of a foil card according to the invention.

FIG. 1 shows an example of the structure of a foil card according to the invention.

In this figure, an assembly of different layers is represented.

The best solution proposed by the invention is to use instead of virgin raw materials, recycled material (PVC, PET or metal) in the foil card construction.

In FIG. 1, the foil card construction 10 comprises three parts: A front foil construction 11, a back foil construction 12 and in between a core 13 comprising an antenna 14 which extremities are connected to a chip (not represented). The antenna 14 and the chip ensure a contactless communication with a reader.

Ideally, all parts of the card are composed of recycled material.

The front card foil construction 11 comprises, from the inner to the external face, a recycled PVC layer or sheet 15 on which a recycled transparent PET sheet 16 is glued (glue referenced 18).

The recycled PET (also called R-PET) sheet 16 is metalized (metallization by recycled aluminum evaporation) creating a layer 17 of recycled aluminum. The assembly (recycled PET 16+aluminum layer 17) is a product that is on the market but using here recycled aluminum is new.

The PVC layers (13, 15, and 20) can have various colored shades.

The recycled PET sheet 16 is protected by a recycled PVC overlay 19.

The back card foil construction 12 comprises, from the inner to the external face, a recycled PVC layer 20 on which a transparent recycled PET sheet 22 is glued (glue referenced 21). The recycled PET sheet 22 is here not metalized with a sheet of recycled aluminum.

The recycled PET sheet 22 is protected by a recycled PVC overlay 23.

The above description corresponds to an ideal realization of a card according to the invention (all components are made of recycled material).

However, the main point of the invention is to use recycled PVC for the recycled PVC layers 15 and 20.

Figure 2:
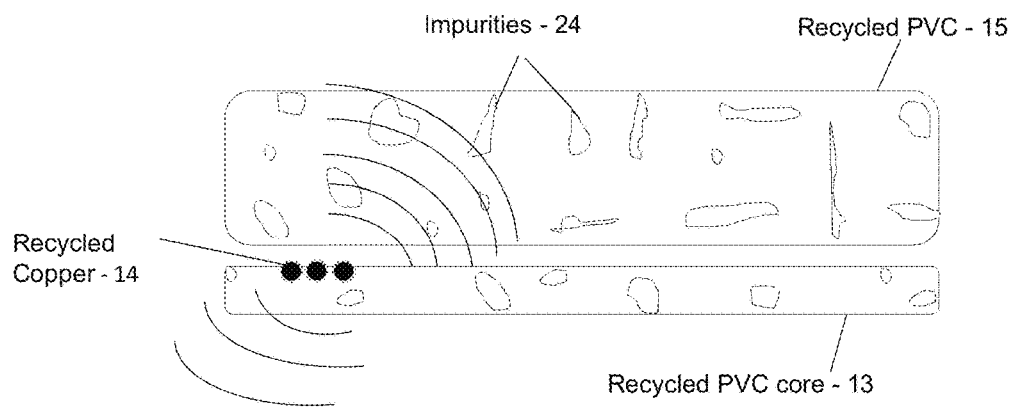
FIG. 2 an inlay in recycled PVC comprising an antenna and the transmission of RF signals through the recycled PVC sheet.

This has the advantages to:

Use recycled PVC;

Facilitate the transmission of the RF waves between the antenna 14 and the reader, as shown in FIG. 2.

As can be shown in this FIG. 2, the recycled PVC core 13 supporting the antenna 14 is laminated on the recycled PVC sheet 15. Thanks to the impurities 24 comprised in the PVC sheets 15 and 20, the RF waves are transmitted and received with a better efficiency that when using pure PVC sheets (instead of recycled PVC sheets).

It has been proved that the use of recycled material for manufacturing the PVC layers 15 and 20 improves the transmission power of the card, since the PVC layers comprise impurities due to the use of recycled material.

These impurities 24 are naturally present in the recycled PVC raw material post or pre consumer from previous usage and are mainly: residues of inks, surface treatments, holes, dust, . . .

It has been estimated that when using only recycled PVC for manufacturing the sheets 15 (20, and 13), the PVC layer is made of 99% or less of recycled PVC (in fact the data sheets of the recycled PVC makers mention 100%). Ideally, the recycled PVC layers 15 and 20 are made of at least 25% of recycled PVC. This ensures a good RF signal transmission between the antenna 14 and an external RF reader.

Recycled PVC, post-industrial or post-consumer, is an impure product, thus is full of more or less small particles, creating micro dots in the layer. These dots will increase the permeability of the PVC, thus will help to a better radiation of the antenna, resulting to an improvement of the RF performances. This concerns, white colored or transparent PVC.

The antenna 14 is preferably made of recycled cupper and engraved on the recycled PVC core 13.

As said before, in regard of FIG. 1, the PET layers 16 and 22 are preferably made of recycled PET.

And the transparent PVC overlays 19 and 23 are preferably also made of recycled PVC.

The aluminum foil 17 is also preferably constituted of recycled aluminum.

The represented card is a contactless card but it can also be a twin card, i.e. a contactless card and a contact card. In this regard, the card also comprises external contacts connected to the chip.

The card according to the invention suits for different applications, like for example, banking, loyalty, . . . It can therefore be a banking card or a loyalty card.

Preferably, all the elements composing the card are made of recycled material.

The recycled PVC layers 15 and 20 can be white, colored or transparent.

The recycled PVC can have different origins: Post-consumer (comes from the humans who depose their PVC products in containers for recycling) or post-industrial recycled PVC (comes from industries).

This also applies to the other components of the card (PET, overlay, copper).

Virgin PET with R-PET (which is already highly used in the production of bottles), can also be used.

Virgin aluminum can be added to recycled one (which is already recycled in coffee caps).

Virgin copper can be added to recycled one (which is already largely reused in the building industry).

Virgin PVC can be replaced by recycled PVC (from pre or post-consumer, already used in banking cards).

Another important point is that normally to improve the performances of standard foil cards made of non-recycled material implies the development of new antenna with additional turns of wire, which is:

complicated due to the space on the card;

more expensive (more wire, longer to produce);

more complicated in term of stock management.

Thus the invention proposes a solution which allow to keep the same reference and designs.

The invention claimed is:

1. A card comprising an antenna (14) connected to a chip, said card comprising:

A central PVC core (13) made of recycled PVC supporting said antenna (14);

Two recycled PVC layers (15, 20), a front side PVC layer (15) and a back side PVC layer (20), each PVC layer being laminated on a side of said central PVC core (13), said front side PVC layer (15) being laminated on the side of said PVC core (13) supporting said antenna (14);

Two transparent PET layers (16, 22), a front side PET layer (16) and a back side PET layer (22), said PET layers (16, 22) being glued on each of said recycled PVC layers (15, 20), said front side PET layer (16) being metalized by an aluminum foil (17); and Two PVC transparent overlays (19, 23) glued on each external face of said card.

2. The card according to claim 1, wherein said antenna (14) is made of recycled copper.

3. The card according to claim 2, wherein said antenna (14) is engraved on said PVC core (13).

4. The card according to claim 3, wherein said PET layers (16, 22) are made of recycled PET.

5. The card according to claim 4, wherein said transparent PVC overlays (19, 23) are made of recycled PVC.

6. The card according to claim 5, wherein said aluminum foil (17) is constituted of recycled aluminum.

7. The card according to claim 6, wherein it also comprises external contacts connected to said chip.

8. The card according to claim 7, wherein said card is:

a banking card, or a loyalty card.

9. The card according to claim 8, wherein it is only composed of recycled material.

10. The card according to claim 9, wherein said recycled PVC layers (15, 20) are made of 99% or less of recycled PVC.

11. The card according to claim 10, wherein said recycled PVC layers (15, 20) are made of at least 25% of recycled PVC.

12. The card according to claim 11, wherein said recycled PVC layers (15, 20) are white, colored or transparent.

* * * * *